US008700795B2

(12) United States Patent
Boulter et al.

(10) Patent No.: US 8,700,795 B2
(45) Date of Patent: *Apr. 15, 2014

(54) INTERNET RADIO AND BROADCAST METHOD

(75) Inventors: Jeffrey R. Boulter, Los Angeles, CA (US); Todd M. Beaupre, Los Angeles, CA (US)

(73) Assignee: Pandora Media, Inc., Oakland, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 12/765,525

(22) Filed: Apr. 22, 2010

(65) Prior Publication Data

US 2010/0205166 A1    Aug. 12, 2010

Related U.S. Application Data

(63) Continuation of application No. 09/709,234, filed on Nov. 9, 2000, now Pat. No. 7,711,838.

(60) Provisional application No. 60/164,846, filed on Nov. 10, 1999.

(51) Int. Cl.
*G06F 15/16*        (2006.01)

(52) U.S. Cl.
USPC ......................................................... 709/231

(58) Field of Classification Search
USPC .................................................. 709/200, 231
See application file for complete search history.

(56) References Cited

U.S. PATENT DOCUMENTS

| 5,892,915 | A | 4/1999 | Duso et al. | |
|---|---|---|---|---|
| 6,557,042 | B1 * | 4/2003 | He et al. | 709/231 |
| 2007/0183430 | A1 * | 8/2007 | Asmussen | 370/395.51 |
| 2010/0192179 | A1 * | 7/2010 | Ellis et al. | 725/40 |

FOREIGN PATENT DOCUMENTS

| WO | WO 0153994 | 7/2001 |
|---|---|---|
| WO | WO 2006130985 | 12/2006 |

\* cited by examiner

*Primary Examiner* — Jerry Dennison
(74) *Attorney, Agent, or Firm* — Beyer Law Group LLP (57) ABSTRACT

Data streams are generally selected according to user preferences and transmitted to the user in general alignment with expressed preferences of the user. Such data streams may be music, including music videos. Users may indicate their general or specific preferences with regards to song, artists, or albums. Any other aspects or factors that might affect the user's preferences can be taken into account. A playlist is created that combines all of these factors. The playlist then serves as the basis for feeding the data streams to the user. Each user is able to express his or her own preferences and receive music corresponding to those preferences on an ongoing basis.

18 Claims, 3 Drawing Sheets

INTERNET RADIO AND BROADCAST METHOD

CROSS-REFERENCES TO RELATED APPLICATIONS

This application is a continuation of application Ser. No. 09/709,734, filed Nov. 9, 2000, now U.S. Pat. No. 7,711,838, and entitled "Internet Radio and Broadcast Method", which claims the benefit of U.S. Provisional Application No. 60/164,846, filed on Nov. 10, 1999, entitled "Internet Radio and Broadcast Method", the contents of each of which are incorporated herein by reference.

BACKGROUND OF THE INVENTION

1. Field of the Invention

This invention relates to Internet media data streams and the like, and more particularly to a copyright-compliant audio/video/radio broadcast system over the Internet where each individual user is able to set his or her preferences regarding works played so as to influence the frequency such works are broadcast to the user.

2. Description of the Related Art

The rise of the Internet has provided many different channels through which media can be presented to users. RealNetworks' RealMedia, Apple QuickTime, and Windows Media all provide players through which live or previously-recorded data streams can be displayed, played back, or broadcast to the individual user. Both audio and video are generally available through these programs and provide a higher and more attractive degree of interactivity with the Internet.

Regular radio broadcasts are based upon a central individual or station broadcasting songs, or other audio information, electromagnetically. Different radio stations are separated by their different carrier frequencies. Amplitude modulation (AM) and frequency modulation (FM) provide two means by which radio broadcast can be effected by a transmitter to a receiver. If an individual wants to affect the songs that are played by the radio station, he or she may write, call, fax, e-mail, or otherwise transmit their preferences to the radio station.

However, one person's preferred music may not be as appreciated by another individual. Music can be very personal, often affecting a person at an emotional level. When the radio station broadcasts a song or other audio signal, all receivers tuned to the carrier frequency pick up the broadcast and either enjoy or suffer the broadcast equally.

It would be much more advantageous to allow each individual to influence, their own set of song playlists. Currently, this is not achievable by wireless broadcast means. However, unique data stream addressing available through Internet data processing might provide means by which an Internet radio could be advantageously affected. Other Internet broadcasting processes are known, but generally follow the known radio station format of broadcasting a single song, or data stream, to all users tuned to the station or channel. In compliance with the Digital Millennium Copyright Act (DMCA), such a radio would have to comply with statutory regulations regarding the broadcast of songs and would generally have to avoid the role of an "on-demand" system, as this might be in violation of statutory regulation.

SUMMARY OF THE INVENTION

The present invention provides a copyright-compliant, broad-based, individually-tailored Internet media broadcast system and method. The present invention provides means by which users may individually rate or indicate music, music videos, or other recorded media that they enjoy hearing from a vast musical or other database. Additionally, such users may also indicate the exclusion of music/media that is to their distaste. In so doing, the user interaction is limited to that decision-making role that is necessary for the user to establish his or her preferences. The Internet radio of the present invention and its method take care of the rest, providing the end user a media or radio channel tailored to his or her own musical tastes. In this way, the present invention can be said to "microcast," or "narrowcast" the content of personalized songlists to individual listening stations or users. As the broadcast uses Internet protocol, each data packet of each data stream has its own individual address, namely, the end-user's data stream player. As the present invention is scalable, thousands, even tens or hundreds of thousands of listeners can be handled by the present invention. With the advance of data-transmission technology, tens or hundreds of millions of users may be served by, or given access to, a system incorporating the present invention, including the delivery of user-preferred data streams by wireless communication links.

Mention is made herein of the present invention with respect to music broadcast to provide a personalized Internet, or data stream, radio. Note should be taken that use of the term "radio," "music," and the like includes any recorded datastream content, including music videos and the like.

At the core of the present invention is the playlist generator. It is the generated songlist that is associated with the user's account and indicates to the system which song is to be played next. Once a song has been selected, it is then streamed as data out to the individual's computer (uniquely identified by Internet protocol). As the central server of the system can handle a large number of users at any one time, it becomes possible to serve each user with his or her own individual data stream. In this case, the data stream comprises audio and/or video information and serves to establish a situation similar to each user having his or her own individual radio station that he or she programs. The list can be created in advance and stored, or generated, in real time when needed. Collaborative filtering techniques may be used in constructing the playlist.

Other applications for the present method may also exist when similar circumstances are present where a large database of information is available that is subject to individual preferences. In a broad sense, the present invention provides means by which individual subsets of an all-encompassing data space may be defined, modified, and preserved, subject to a variety of influences and allowing some serendipitous, or random, events to occur.

Objects of the Invention

It is an object of the present invention to provide individualized data stream programming according to an individual's preference.

It is yet another object of the present invention to provide an Internet-based radio or music playing system that is biased according to each user's preferences.

It is yet another object of the present invention to provide a means by which song playlists may be generated for such an Internet radio.

It is an object of the present invention to provide copyright-compliant media streams for Internet and other networked systems broadcast

BRIEF DESCRIPTION OF THE APPENDICES

The following appendices are incorporated herein by this reference thereto.

Appendix 1 is an excerpted text listing of a playlist generated in conformance with the present invention.

Appendix 2 is a source code listing for one embodiment of the present invention.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

As mentioned above, use of the term "radio," "music," and the like includes any recorded datastream content, including music, videos, recorded sports events and concerts, and the like.

Figure 1:
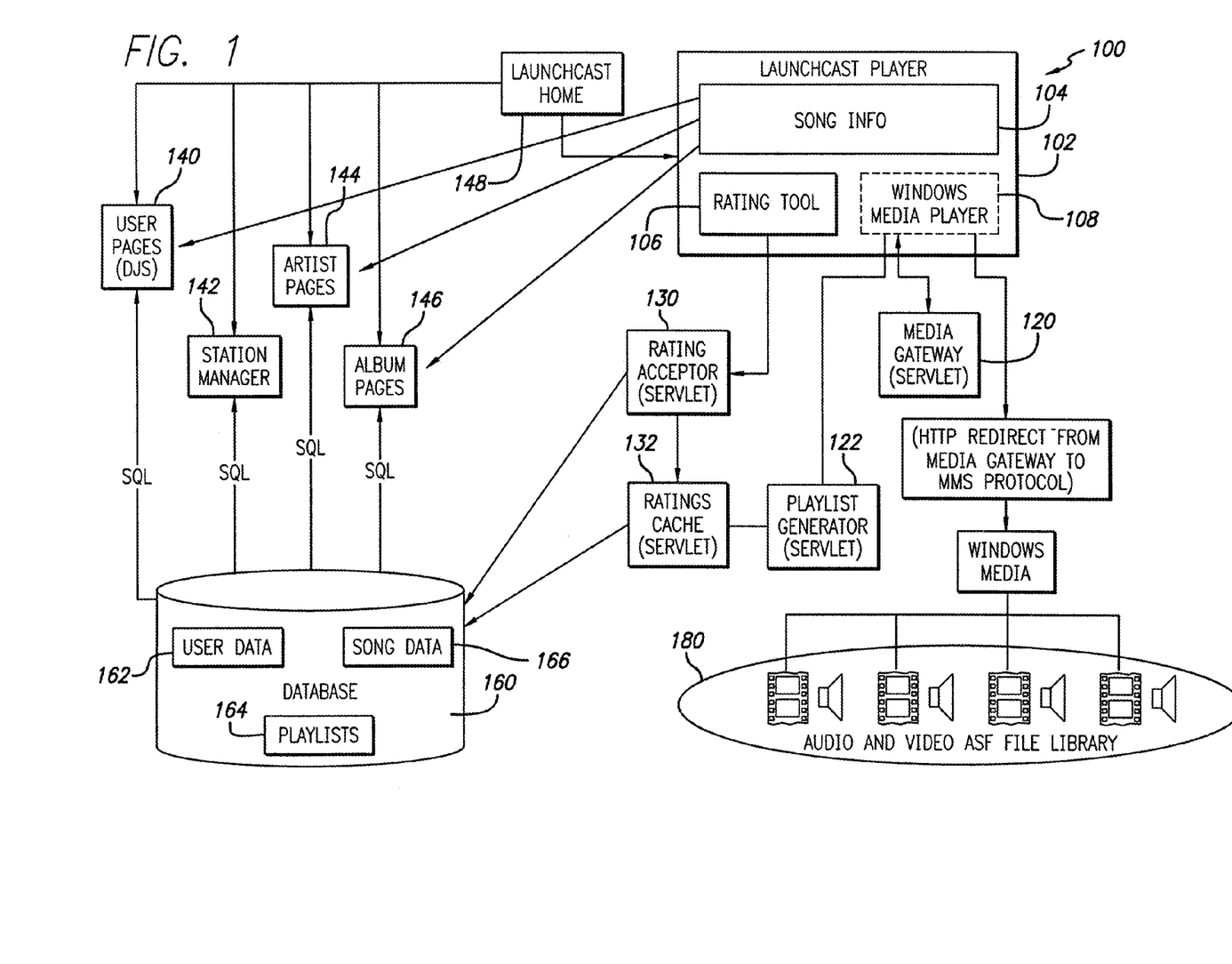
FIG. 1 is a schematic view of the system architecture used to achieve one embodiment of the present invention.

In FIG. 1, the general structure of the present system is shown where the LAUNCHeast Player provides user feedback and indication of song preference through Java Servlets and JavaScript code. In one embodiment, a Windows Media Player may provide the interface allowing the audio and/or video broadcast to take place at the user's computer. Other media players now known or developed in the future may also suffice and operate to good advantage. Mentioned use of the Windows Media Player system is to be considered as indicating any appropriately functioning media player. Song or video information is available through both the player and the accompanying data window.

Referring now to FIG. 1, the architecture and system structure of the Internet radio and broadcast method of the present invention is shown in schematic form. The system 100 is generally focused upon the player 102. The player 102 is the component that the user sees and is ultimately the arbiter of the media datastream service provided by the present invention. As shown in FIG. 1, the player 102 has a song information section 104, a rating tool 106, and a player 108. For this last component, the player 108 is indicated as being a Windows Media player. However, other media players can also be used to good advantage in order to achieve the present invention.

Through its components, the player 102 is linked or associated to a number of other sources of information and programs, including Java or other servlets. The present invention, when implemented in software, may be so implemented using Java-family of computer program languages. A servlet is Java programming that runs as a part of a network service, such as an HTTP server, in response to requests from clients. In this case, the client can be considered to be the player 102 while the HTTP server can be the servers for the database 160 and the media content library 180.

At a center of the present invention is the player 108. The player 108 allows the content to be broadcast to the individual user and serves as means by which the user can enjoy such content. In addition to being linked to the media database 180, the player 108 is also in communication with a media gateway servlet 120 and a playlist generator servlet 122. As discussed in more detail below, these two servlets provide the player the ability to play streaming media in conformance with the present invention.

The rating tool 106 is coupled to the database 160 via a rating accepter servlet 130 and a ratings cache servlet 132. As indicated in FIG. 1, the rating accepter servlet 130 and ratings cache servlet 132 are also in communication with one another, as set forth in more detail below.

The song information component 104 of the player 102 may provide links to other information available through the database 160 or otherwise. For example, the song information tool 104 may provide links to other user pages 140, a station manager 142, provided home pages of various artists 144, as well as links to album pages 146 of such artists or otherwise. Additionally, a central homepage 148 may be present that allows travel or linking to any or all of available pages or services.

Note should be taken that the database 160 is not necessarily the home for the media library 180. In fact, according to present technology, it may be more advantageous to provide some means by which high-speed access can be provided to the media library 180. By separating the database 160 from the media library 180 faster and better service may be provided to users so they may enjoy the content of datastream better. Certain infrastructures may allow for offsite residence of the media contained in the media library 180. Pointers or other indicators to such information in an indexed or other form can thereby provide the link necessary to deliver the preferred or indicated content by the user from the media library 180 to that same user.

As shown in FIG. 1, the database 160 may hold a variety of types of information, including: user data 162, playlists 164, and song data 166. Such information is stored by the database 160 and updated by the servlets as set forth in the present invention, including the user code set forth in Appendix 2.

Figure 2:
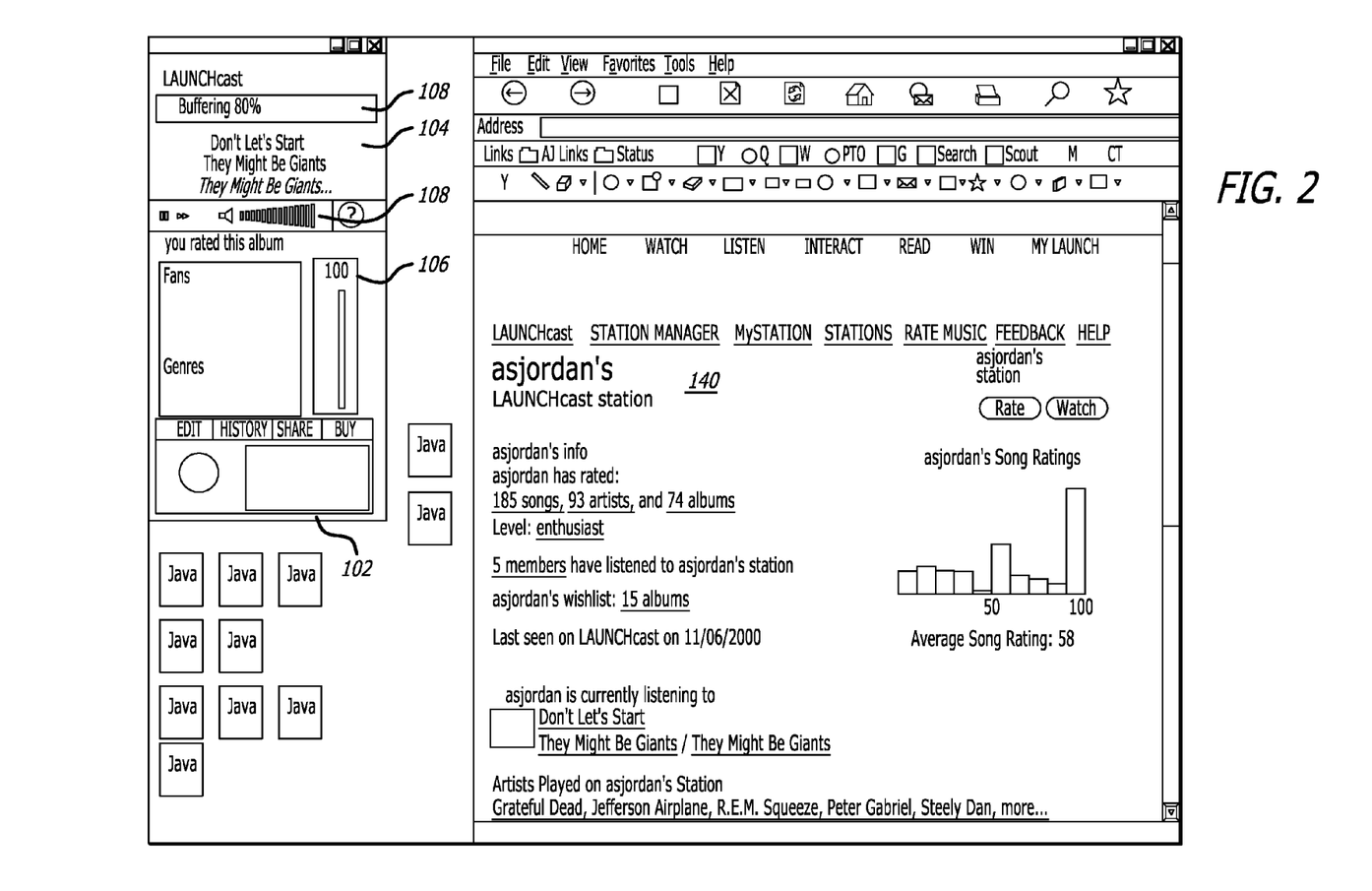
FIG. 2 is a screen shot showing a computer desktop with the audio player and user homepage for the present invention.

In FIG. 2, the player, or playback, window 102 is shown and is highly interactive with several embedded hyperlinks. In the upper right-hand corner of the playback window 102, the indication of "asjordan" is made. By clicking on this link, more information about the current station may be given and/or the ability to change such station. The user's page 140 may be activated and shown upon clicking the username link. In the right center of the playback window, a "RATE IT" window indicator that is the rating tool 106 is given, allowing the individual to rate the current "SONG", the "ARTIST" performing the current song, and/or an "ALBUM" containing the song. Below the "RATE IT" indicator, hyperlinks to "RECENT SONGS", "BUY", and "STATION MANAGER" are present allowing the user to travel to those destinations and either learn more information, purchase or review pinchasing information about the current album being played, as well as access the station manager for the present invention.

Below the song information window 104, icons are given for Play/Pause, Skip This Song, Skip This Song and Never Play It Again ("Delete"), and a Volume control. The question mark ("?") shown below the "Song Information area" window is a hyperlink to a Help file for the playback window 102 and the Internet Radio system of the present invention. These icons are also shown in the other playback window figures, such as that for the video playback user interface/client 102 shown in FIG. 3.

Figure 3:
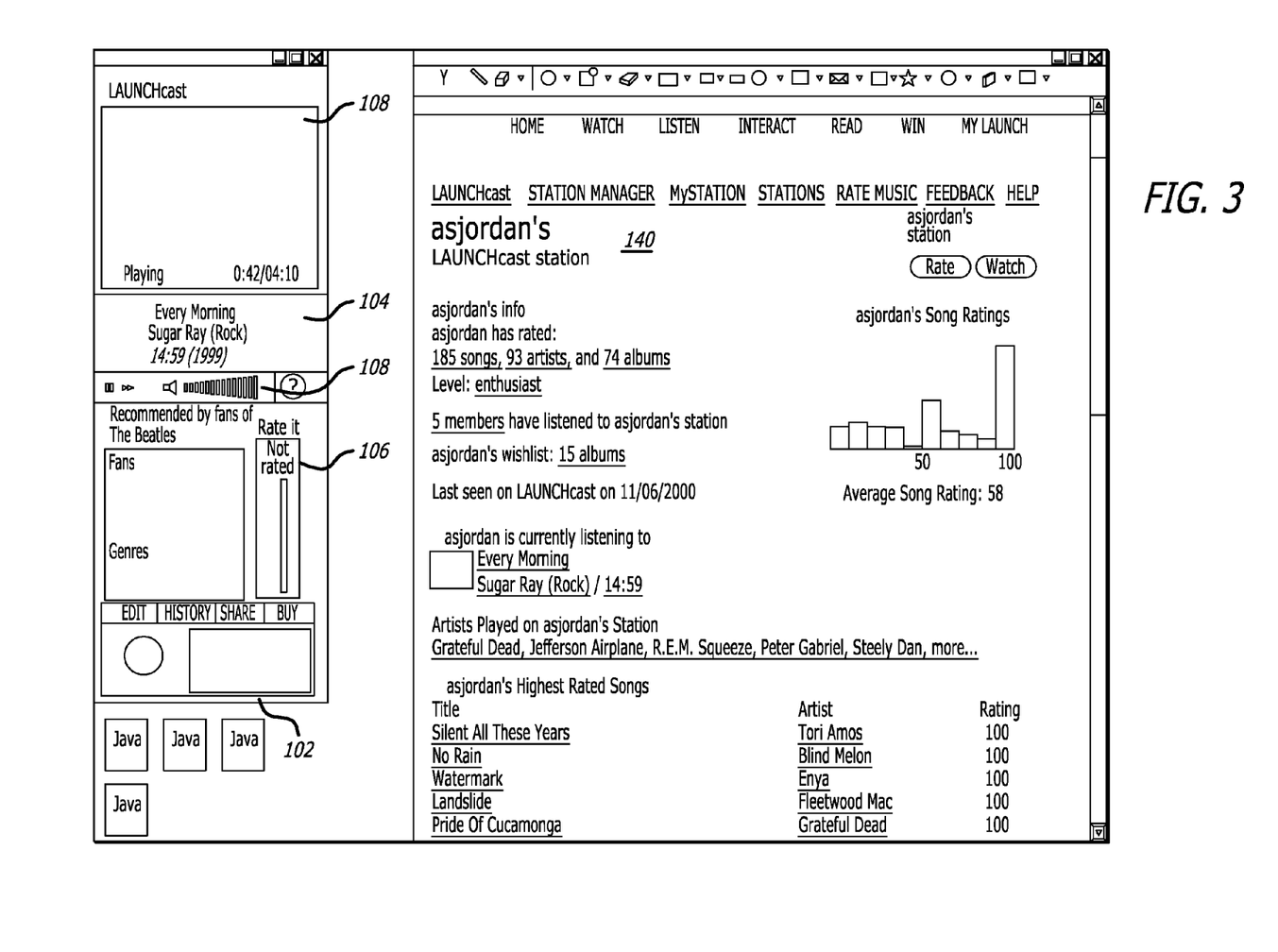
FIG. 3 is a screen shot showing a computer desktop with the video player and user homepage for the present invention.

FIGS. 2 and 3 show a desktop display of the system 100 in action from the user's point of view. A tool lip may be given when the cursor hovers over the song title. The same may be similarly true for the artist and the album currently playing. Note should be taken that just as the song rating indicator is highlighted and active in the middle right section of the playback window, the song title is highlighted in the upper portion of the playback window.

Additionally, the left and center middle portion of the playback window provides information regarding fans who have strong positive feelings about the present song, artist, and/or album, as well as an average rating for all users or some subset of users on the system.

FIGS. 2 and 3 show small balloons on the right-hand side of the central dark area across from the "Fans." These balloons may have a letter "W" inside of them to indicate another listener is currently online and can be engaged via the instant messaging ("whisper") function. FIGS. 2 and 3 also show graphic information that may be used for advertising or other hyperlinks. In generating the playlist of the present invention, the user can be informed as to why a particular song was picked.

For other links and presentation of information in the player 102, a tool tip may be presented when the cursor hovers over an area. A tool tip is a small window providing succinct information about the item under the cursor when the cursor hovers over that item.

When the system 100 is updating and obtaining a new data stream from the system for the user, a display may be given to the user to indicate ongoing activity of the playback system. Such visual activity in the form of animation assures the listener/viewer that the short span of silence, or "dead air," following a song is only temporary and that a new song will soon play. Generally, in order to promote interactivity and to take advantage of the new media that the Internet provides, the windows shown in the FIGS. 2 and 3 contain ample internal hyperlinks that lead to web pages providing information regarding music, artists 144, and/or their works 146, web pages regarding other users of the system (as DJs or otherwise) 140, and/or web pages regarding the user's control of the system (preferences, etc.) 142.

The default paradigm for the user interface/player 102 is to allow the user the greatest degree of freedom in expressing preferences and in obtaining that preference information regarding music artists, and their publications/albums. In this way, the user's experience is enhanced as he or she hears more of the music he or she likes. Access to purchasing web sites is also made available where users may purchase artists' works.

In implementing the present invention in software, the accompanying source code (Appendix 2) may be used to achieve the present invention. Such code is subject to copyright protection and is owned by LAUNCH Media, Inc. of Santa Monica. Calif.

The generation of a proper playlist combining available user ratings and a media database forms an important part of the present invention. One such playlist as generated by the present invention is shown in Appendix 1 and is an excerpted form for purposes of explanation. Entries in the playlist have been removed so that the playlist may better serve the explanatory purposes herein without undue length or the sacrifice of sufficient detail.

Playlist generation occurs when a user launches his client player 102. A Windows Media or other player 108 is embedded in the user's client player 102. The player 108 opens a call to the playlist generator servlet 122 as executed by the PlaylistGeneratorServlet routine (Appendix 2, page 158). The expected output from this HTTP call is an ASX playlist file, which in the present invention is list of pointers to a script that reads the actual playlist data object from the database 160.

The playlist generator servlet 122 parses the particular parameters for this ASX playlist as follows:
  Object: GeneratorParameters;
  userID: (required) the user for whom the playlist is generated;
  djID: (default is userID) the user whose profile will be used to generate the playlist;
  moodID: (default is none) a mood which is a subset of a profile may be indicated and used to alter the preferences in the playlist and under which to listen (optional); and
  bandwidth: (default is 28.8 k, if not read from the user's preferences in the database) the bit rate at which the user wishes to listen.

The database 160 with the playlist database 164 is checked for an existing playlist by PlaylistStatus (Appendix 2, page 192). If a playlist already exists, it can be used it if all the following are met (and PlaylistStatus.isState( ) returns false):
  all of the parameters (userID, djID, etc) match;
  there are more than 8 songs left;
  the newRatingsCount (counter of new personalization data since last refresh) is less than 15; and
  the playlist is less than a week old.

If all these conditions are met, the dates for the last time the user listened to an ad, news bit, and tip may be reset and the playlist may be resaved. The ASX file is written out and media player begins to execute by making requests to the media gateway 120 to play music.

If the old playlist cannot be used, a new one is created with the playlist generator via PlaylistGenerator.create( ).

The first step is to retrieve the user's preferences via PlaylistGenerator.getOptions( ). In response the following options are returned:
  unratedQuota: how much new (not rated) music they want hear in their playlist. The options here are 90, 80, 70, 50, 40, 30, and 20 percent. The default is 50 percent.
  explicit lyrics: Does this user want us to play music with explicit lyrics? True or false.
  bandwidth: if the bandwidth is not already specified in the generator parameters, it is read from stored data. Currently, bandwidth options include 28.8, 56, and T1/LAN. The default is 28.8 if a valid setting of "none" is found in the database.

A list of all the possible songs available for play (via PlaylistGenerator.gatherMedia(( ) as well as some other data about those songs is obtained. This is generally done using multiple threads running at the same time for better performance. The list of songs is held in hashtable (as via the Population subroutine (Appendix 2, page 198)).

The database 160 is first called to load a history of all the songs played for the user in the last 30 days. This is stored in the database as a long string, formatted as: "Date>=<songID>,<Date>=<songID>..." For performance reasons, reading one siring from the database is faster than reading potentially several thousand rows individually from the database. Dates older than 30 days are ignored and the last lime a song was played overwrites previous plays of a song. Each time a song is played via the media gateway 120, this string is appended.

After the history loading is complete, a random integer is picked from 1 to 10. If the value is 1, the date and songID string is recreated and rewritten to the database. This cleans up the string by removal of songs that were played more than 30 days ago as well as duplicate entries for the same songID.

The history loads as a thread, and another database call is made to get the user's, or DJ's, list of subscribed DJs, genres, and radio stations (via PlaylistGenerator.getSubscriptions(( ) for the specific mood requested. The result of this call is three lists called DJs, genres, and stations.

Once the subscriptions are available, the ratings are obtained via GetRatings. This is also done in a thread. The song hashtable, another hashtable that contains Artist and Album ratings (ItemsProfile), the DJ, and the list of subscribed DJs are all passed to the GetRatings method routine.

A retrieval list of users whose ratings are to be retrieved is compiled using the subscribed DJs and the DJ requesting the playlist. A request is made to the ratings cache to retrieve all these ratings via RatingsCache.getRatings( ).

When the playlist generator has all the ratings, it is ready to assemble them into categorized data structures, based on the properties of each rating. It iterates through all the ratings and stores them in the following manner. If the ID of the user is the DJ and the rating is 0 (an 'X' in the end-user interface), the song is added to song hashtable (via Population) as an "Excluded" type, meaning that song should never be played. The rating is also added to the average rating for songs by that artist. If the rating is not 0, the song information cache is immediately checked via SongInfoCache.gel( ) for data about this song. If the data does not exist in the cache, it is a song that was rated, but is not available for play (as possibly not encoded), and the song is immediately marked as an "Excluded" song.

If all of the above tests pass, the song is added to the song hashtable with a type of "Explicit". The rating for the song is included in the calculation of this DJ's average rating of songs by the artist.

Each song that is rated by subscribed DJs is added to the song hashtable. The subscribed DJ's rating for the song is included in the calculation of the subscribed DJs' average rating for this song.

For albums, the ratings profile is obtained from the item rating profiles. If a ratings profile for an album does not yet exist, then the data regarding the album is retrieved and a ratings profile is created.

If the rater is the user requesting the playlist, the rating for this item is set to the user's rating. However, if the rater is a subscribed DJ, the rating is added to the DJ's average for this album.

For artists, the rating procedure is the same as for albums, except any ratings made for the artists listed as "Various Artists", "Soundtrack", or "Original Soundtrack" are discarded or ignored in the relevant calculations.

The top 1000 most popular songs (via PlaylistGenerator.getPopular( )) in the bandwidth type specified may be added to the song candidate hashtable. This popular list is maintained in the song information cache. Before each song is added to the song hashtable, inspection is made see if the song is already in the candidate hashtable (perhaps put there by another query). If so, inspection is made to make sure that the song is not of type "Excluded", or the song is discarded. If the song is added to the song hashtable, it is added under the type "Unrated".

A maximum of 5000 songs are picked randomly (via PlaylistGenerator.getRandom( )). Initially, a count is made of the number of songs contained in each and all of the genres a user has selected (via SongInfoCache.countInGenres( )). Songs may be in multiple genres. The number of songs is then divided by the total number of songs in the song information cache. If the result is less than 5%. songs are picked directly from a list of songs only in those genres. Otherwise, songs can be picked randomly from all available songs. This calculation may be performed to avoid the situation where a user has selected a small number of genres and picking songs randomly will return only a few songs that are available or allowable for play when considering their genres.

In order to select songs only from selected genres, a determination is made of the total number of songs to pick (via totalToPick) from the lesser of 5000 and the total number of songs in the selected genres, for each genre, a copy of the list of songs in that genre is obtained from the song information cache (via SongInfoCache.getInGenre( )). The number of songs to pick from each genre is determined from the following formula: songs to pick=totalToPick * (number of songs in this genre/total number of songs in the selected genres).

The determined number of songs is picked and attempts are made to add the songs to the song hashtable with a type of "Unrated". A song is not added if it is already in the hashtable.

In order to select from all songs, a song is randomly selected 5000 times. Each time, attempts are made to add the song if it is not already there as picked, as described above. Once the process finishes adding random songs, all the ratings for the songs are retrieved as are all the dates of when the songs were played for the user. The explicit, implicit, and unrated lists built in the last step are taken and ordered in descending order by score, or rating, using a quicksort or other algorithm.

The number of songs to pick from each list is determined. For example, if the size of a playlist is 50 songs, the following may occur. If the user is listening to his own station, the following formula may be used: if the user's list of explicit and implicit songs is smaller than 100 songs, 90% of the songs must be picked from the unrated list to avoid playing the user's rated songs too much. The user's unrated quota may, then, be set to 90. Otherwise, an unrated quota may be used from the user's stored options.

Under some circumstances the maximum number of songs available from the explicit and implicit song lists is calculated as follows:

$$maximumRated = playlistSize * (100 - unratedQuota) * 0.01.$$

The maximum number of songs available from the explicit list may be calculated as:

$$MaximumExplicit = \text{number of songs in the explicit list} * 0.20.$$

A number of songs to pick from the explicitly-rated list may then be:

$$explicitToPick = playlistSize * (100 - \text{unrated quota}) * 0.01 * (\text{number of songs in the explicit list/sum of explicit and implicit songs}) * 3);$$

From this the number of implicit songs is simply:

$$implicitToPick = maximumRated = explicitToPick.$$

Confirmation can be made to ensure that more explicit songs have not been picked than indicated by maximumExplicit and that no more implicit songs have been picked than those that are in the implicit list. The number of unrated songs is then: playlistSize−(explicitToPick−implicitToPick)

If the user is listening to a station other than his own and the number of songs in the explicit and implicit list total greater than 200, then the following calculations are made:

explicitToPick=Minimum(playlistSize*0.50, 20% of explicit songs): and implicitToPick=Minimum(playlistSize. # of implicit songs)−explicitToPick If, for some reason, a sufficient and/or playlistSize number of songs is not obtained from this calculation, a third of the songs is picked from each of explicit, implicit and unrated songs with a check to ensure that not more than 20% of the songs on the rated and unrated lists are picked. As a fallback measure if none of the methods above used to calculate the number of songs to pick worked, the songs are selected as a third of the playlistSize from each list, making sure not to pick more than 20% of the rated and unrated lists.

A list of albums and artists from and by which songs have been played for this user in the last 3 hours is copied or otherwise made available to the process set forth herein and the songs for this playlist are picked via PlaylistGenerator.pickSongs( ). A list of all the picks needed is made (via PickList). For example, if there is a playlist of 50 songs, the list may contain 10 entries for explicit songs, 20 for implicit songs, and 20 for unrated songs.

While there are still songs to pick, iteration is made through the following cycle:
a. randomly pick a song list type (explicit, implicit, unrated) with a probability based on the proportion of songs to come from each list;
b. pick a random song index from that list (which has already been sorted in descending order of score), based on the following formula (via SongGroup.pick Random( )):
sizeOfList=the number of songs in this list;
random=a randomly-chosen number between 0 and (sizeOfList−1) 0.01; and
index of song to pick=((rand^7)/sizeOfList−1^7)* (sizeOfList−1)).

This formula allows songs to be picked somewhat randomly, while guaranteeing a high probability that the song picked will come from highest scored. The higher the ranking of the song in the score matrix, the higher the probability it will be picked. This algorithm scales well for any size of list because it is rank-based, not just score based.

The song at that index is removed From the list. If for some reason a valid song is not obtained (possibly the song list already exhausted), another song is added to the list of types to pick of this type.

Once a song is picked, its album and artist information are obtained.

If the artist is not a "Various Artist" and the sum of the number of songs played by this artist and already picked for this playlist by this artist is greater than or equal to 3, this song cannot be played under the RIAA (Recording industry Associates of America) and/or DMCA (Digital Millennium Copyright Act) rules. Other rules may also be implemented in the present invention to accommodate statutory and other rights and/or restrictions.

The song is marked as "rejected" and another song is added to the list of songs to pick from the same list the rejected song was picked from. The same test is performed for albums, with the maximum played, for example, being 2. If the song was picked successfully and was within legal or other boundaries, the number of songs picked from this album and by this artist is incremented. The song is added to the final list of songs for the playlist and the order in which the song was picked for the playlist is marked, or noted.

If, for some reason, a playlistSize number of songs is not obtained, the existing playlist is deleted and popular songs are added to the song hashtable, and the song lists are re-sorted and re-picked ignoring the user's genres selections.

The picking of news clips is done simply by picking a specific number of unique news items that are in the specified bandwidth format. A list of available news clips is stored in the song information cache. Ads may be picked in the same way as news clips are picked. However, a difference may be present in the different number of ads to pick. Tips may also be picked in the same manner as news clips, with a different number of tips to pick.

The order of the songs may be randomly shuffled in the playlist and the playlist may be serialized and saved to the database. Finally, the ASX file may be returned to the player 108.

Every 5 minutes, the player 102/108 "pings" the Playlist Generator 122. If the playlist is stale or has 8 songs or less left in it, the playlist generator regenerates the playlist and replaces the one previously saved in the database.

As an additional enhancement to the present invention, playlists from commercial and other radio stations throughout the United States, and elsewhere, are made available so that playlists may be affected by such radio stations and by popularity of particular musical works.

In achieving the Internet radio of the present invention, a rating acceptor 130 in the form of the Rating WidgetServlet routine (Appendix 2, page 222) takes HTTP requests to rate and gets ratings for songs, albums, and artists. When a rating is saved, it written to the ratings database and if the user who rated the item is designated as being in the ratings cache, the rating change is added to the queue of ratings updates.

Once every minute, the ratings updates are sent to all the ratings caches that have registered their IP address in the database. Every hour, the list of ratings caches are retrieved from the database. Every ten minutes, the list of users in the cache are retrieved from the database.

The song information cache is implemented through the SongInfoCache routine (Appendix 2, page 265) and may be a large in-memory cache of relatively static data that is used in playlist generation. It may include a list and hashtable of all songs which includes identifying numbers, media formats available, average rating, artist and album information, explicit lyrics mark, genres the song is in, and radio stations that play the song. Also, other information may be included in the song information cache, including: a hashtable of artist information; a hashtable of album information; a list and hashtable of all ads including identifying numbers and media formats available: a list and hashtable of all news clips including identifying numbers and media formats available: a list and hashtable of all audio tips including identifying numbers and media formats available: a lists of the 1000 most popular songs in each media format; lists of all songs in each genre; and a cache of frequently-accessed ratings profiles. This last cache is seen in the RatingsCache 132 routine (Appendix 2, page 211). The song information cache is completely rebuilt once a day from the database.

The ratings cache caches the entire ratings profile for the top 100 users who are known to be accessed frequently. The ratings cache is implemented through the RatingsCache routine (Appendix 2, page 211). On startup, the ratings cache registers its IP address in the database to subscribe to ratings updates. These users are typically DJs (users with broadcasted or subscribed ratings) that have many subscribers, or users who simply use LAUNCHeast frequently. Each ratings cache recalculates the most frequently-accessed users and writes it to the database every 8 hours. At that time, the entire cache is discarded and reread from the database to erase any lingering corruption. Each ratings cache checks the database every 10 minutes for changes in the list of users to be cached and updates the ratings cache as appropriate.

Note should be taken that many of the parameters set forth herein are discretionary and advisory. Consequently, those properly and legitimately implementing the present invention may alter such parameters, such as when events occur and event timing as above, according to system operation preferences.

For each user who is not in the ratings cache, their ID is appended to a list of users whose profiles need to be retrieved from the database 160. Users who have been added to the cache recently have their profiles added to the list of ratings to be returned to the PlaylistGenerator 122 routine (Appendix 2, page 158). All non-cached users' ratings are retrieved from the database 160, are appended to the list of ratings, and are returned to the PlaylistGenerator 122. The album and artist ratings are retrieved in a separate query from the song ratings. Each runs in its own thread in parallel for optimal performance.

The media gateway 120 is a Java servlet that brokers the relationship between the end user's (Windows Media) Player 108, the database 106, and media library, or Windows Media Server, 180 and logs all media access. The MediaGatewayServlet routine (Appendix 2, page 112) performs this function. Because the client's Windows Media Player playlist (.sax file) does not contain any information about the actual songs or ads in the user's playlist, the media gateway 120 contains the logic described below to redirect the user's player to the correct media address on the media library 180.

For security reasons, the media gateway 120 may check to see that the client 102 is accessing it from the Windows Media Player client 108 (and not a web browser or other application). If not, it may redirect the user to an error media file. The media gateway 120 then pulls the user's ID off the query string and retrieves that user's playlist object from the database 160. The gateway 120 inspects timestamps in the user's playlist object that indicate when the user last heard an ad, tip, song or other media item and determines if it is time to insert an ad, tip, or news item in the datastream, or just play the next song.

If the user has not heard an ad, for example, for a predefined period of time, the media gateway 120 resets an ad timestamp and retrieves an ad path from the user's ad playlist and passes that MMS (Microsoft Media Server) redirect instruction/address to the end user's Windows Media client 108. If no ad is available, the process continues and plays the next song in the user's playlist. If it is not time to play an ad, the timestamp is checked to see if it is time to play a tip. The process then follows the same logic, above, for ads to retrieve and play a tip, instead of an ad. If it is not lime to play an ad or tip, the timestamp is checked to see if it is time to play a news item. The process then follows the same logic as for ads to retrieve and play a news item.

If it is not time to play an ad, tip, news item, or other stream (the usual case), the media gateway 120 retrieves the path of the next song in the playlist and returns that address via an MMS redirect to the client's Windows Media Player 108. In all cases, the mediaID of the ad, tip, or song played is logged in the database 160 under that user's ID. This logging information is used to display what the user is listening to on the user's station page and under the "Who's Listening" page. These pages may be associated with the central home page 148 in a manner similar to that of the user pages 140 as history data in the playlist generator, and in calculating a Top 100 chart for the most popular songs and/or streams.

While there may be some preference for an "on-demand" service such that individuals may pick their own radio playlists, the element of randomness and pleasant surprise is inherent in the present invention. Additionally, statutory requirements prevent users from turning the Internet into their own home stereo system. "On-demand" service is generally prevented by statute and may be a violation of copyright. Consequently, any statutory regulations, such as the Digital Millennium Copyright Act (DMCA), and other limitations can be programmed automatically into the present invention. In so doing, the present invention complies with all applicable law and delivers to the user a musical experience generally aligned with his or her preferences.

Many users often listen to music while doing programming or the like. Such music can now be delivered over the Internet via the user's very own radio station through the present invention. Additionally, users may select other individuals or DJs, to influence their musical playlist just as the user does. The DJ, online or otherwise, becomes an additional factor in influencing the user's preferences and playlist. Some individuals may act as real DJs, serving to provide content to an audience of subscribers through the Internet. Programs of special interest may also be developed and subscribed to by listeners using the present invention. Through the heavily hyperlinked (but easily understandable) interlace set forth in the Figures and described above, a user may establish musical (or other data stream) preferences. In establishing such preferences, the music played to the listener is tailored to that listener and provides an enhanced musical experience on an individual basis.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

What is claimed is:

1. A method comprising:
   generating an individualized song playlist created for a personalized internet radio station for broadcast via a computer network to a user of a plurality of users, the generating of the individualized song playlist being based on an initial set of parameters associated with a user profile, with the individualized song playlist corresponding to a sequence of songs chosen from a song database;
   transmitting, by a server computer, a data stream to a media player of the user that includes the songs of the individualized song playlist;
   receiving feedback from the user in which the user provides a rating for one or more songs of the individualized song playlist played on the media player; and
   updating, based on the feedback of the user, the set of parameters of the user profile used to generate the individualized song playlist;
   wherein the individualized song playlist is customized based on the feedback from the user.

2. The method of claim 1, wherein the individualized song playlist is generated in real time by selecting, at any one time, a maximum number of songs to be played and performing regeneration of the songs of the individualized song playlist.

3. The method of claim 1, wherein the feedback from the user further comprises at least one other user preference besides a rating.

4. The method of claim 3, wherein the at least one other user preference comprises a preference whether or not to exclude music having explicit lyrics.

5. The method of claim 3, wherein the at least one other user preference includes a musical artist preference.

6. The method of claim 3, wherein the at least one other user preference includes an album preference.

7. The method of claim 1, wherein the feedback comprises user input corresponding to a positive or negative impression of individual songs.

8. The method of claim 1, wherein the feedback comprises a rating based on a rating scale.

9. The method of claim 1, wherein the customized internet radio station is delivered to the media player of the user via a wireless communications link.

10. The method of claim 1, wherein the customized internet radio station is delivered to the user's desktop computer.

11. The method of claim 1, wherein the current song includes associated video content for the song.

12. A system comprising:
   a server computer having an associated database including user data storing user profile information and user preferences, a song database, and selections of parameters to customize generation of song playlists for users of the system:
   the server computer transmitting a personalized internet radio station via a computer network to a user with a sequence of songs from the song database generated by a song playlist generator;
   the server computer receiving feedback from the user providing a rating for one or more songs of an individualized song playlist associated with the user; and
   the song playlist generator of the server computer, in response to the user feedback, updating a selection of parameters of a user profile used to select songs for the user;
   wherein the individualized song playlist for the user is customized based on the feedback from the user.

13. The system of claim 12, feedback from the user further comprises at least one other user preference besides a rating.

14. The system of claim 13 wherein the at least one other user preference comprises a preference whether or not to exclude music having explicit lyrics.

15. The system of claim 13 wherein the at least one other user preference includes a musical artist.

16. The system of claim 13 wherein the at least one other user preference includes an album preference.

17. The method of claim 12, wherein the feedback comprises user input corresponding to a positive or negative impression of individual songs.

18. The method of claim 12 wherein the feedback comprises a rating based on a rating scale.

\* \* \* \* \*